(12) United States Patent
Lin et al.

(10) Patent No.: US 9,103,913 B2
(45) Date of Patent: Aug. 11, 2015

(54) POSITIONING APPARATUS AND SIGNAL PROCESSING METHOD THEREOF

(75) Inventors: Shiou-Gwo Lin, Taipei (TW); Hsiao-Lieh Liou, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 592 days.

(21) Appl. No.: 13/609,171

(22) Filed: Sep. 10, 2012

(65) Prior Publication Data

US 2013/0099970 A1    Apr. 25, 2013

(30) Foreign Application Priority Data

Oct. 20, 2011   (CN) .......................... 2011 1 0320142

(51) Int. Cl.
*G01S 19/43*   (2010.01)
*G01S 19/40*   (2010.01)
*G01S 19/29*   (2010.01)

(52) U.S. Cl.
CPC ................. *G01S 19/40* (2013.01); *G01S 19/29* (2013.01); *G01S 19/43* (2013.01)

(58) Field of Classification Search
CPC .................................. G01S 19/43; G01S 19/29
See application file for complete search history.

(56) References Cited

U.S. PATENT DOCUMENTS

| 5,825,326 A * | 10/1998 | Semler et al. ............ 342/357.27 |
| 6,175,806 B1 * | 1/2001 | Thuente ........................ 701/477 |
| 2011/0187598 A1 | 8/2011 | Dai et al. |

FOREIGN PATENT DOCUMENTS

CN    101403790 A    4/2009

* cited by examiner

*Primary Examiner* — Gregory C Issing

(57) ABSTRACT

A signal processing method of a positioning apparatus includes the following steps. A satellite signal is received to provide at least a distance information. A correction value of a phase measurement time is generated according to the distance information and phase data of the satellite signal are corrected in sequence accordingly. The phase data are received and when a quantity of the phase data is equal to a preset quantity, a first low order polynomial fitting and a first Chi-square test are performed to generate an estimated parameter. A next phase data of the satellite signal is estimated to generate an estimated phase data according to the estimation parameter. An actual phase data is obtained. A detection and a compensation of a cycle slip are performed according the estimated phase data and the actual phase data to output a corrected phase observation value.

14 Claims, 3 Drawing Sheets

POSITIONING APPARATUS AND SIGNAL PROCESSING METHOD THEREOF

BACKGROUND

1. Technical Field

The present disclosure relates to a signal processing method, and more particularly to a positioning apparatus and a signal processing method thereof.

2. Related Art

A relative positioning based on Global Navigation Satellite Systems (GNSS) carrier phase observation value is the most popular precise positioning method. In this method, the coordinates of the observation stations can be measured precisely at centimeter level. When the satellite signal is shielded by objects like trees or is interfered or interrupted by ionospheric effect, multipath effect, problems of a receiver or the like, the receiver cannot lock the signal and thus cannot lock the satellite. As a result, the received signal generates a deviation of an integer cycle, which is called as cycle slip.

The cycle slip is a measurement error commonly appearing in the relative positioning. Therefore, the cycle slip must be compensated in positioning for ensuring the positioning accuracy. There are various methods for correcting the cycle slip. Most of these methods detect discontinuous points of the signal on a time axis. Here, the observation time must be precise to ensure that the discontinuity phenomenon is caused by the cycle slip instead of by non-uniform time scales. Due to this limitation, the low-price GNSS receiver is hard to be applied in the high precise positioning situations of GNSS. Therefore, methods for correcting the cycle slip are still needed improvement.

SUMMARY

The present disclosure provides a signal processing method for a positioning apparatus. The method comprises the following steps. A satellite signal is received to generate at least one piece of distance information. A phase observation time correction value is generated according to the at least one piece of distance information. Phase data of the satellite signal is sequentially corrected according to the phase observation time correction value. The phase data is received and when the phase data reaches a predetermined value, a first low-order polynomial fitting and a first Chi-square test are performed on the phase data to generate an estimation parameter. The next piece of phase data of the satellite signal is estimated according to the estimation parameter to generate estimated phase data. The actual phase data is obtained. A cycle slip is detected and compensated according to the estimated phase data and the actual phase data to output a corrected phase observation value.

The present disclosure also provides a positioning apparatus. The positioning apparatus comprises a receiving unit, a computing unit and a processing unit. The receiving unit receives a satellite signal. The computing unit is connected to the receiving unit and generates at least one piece of distance information according to the satellite signal. The computing unit further calculates a phase observation time correction value according to the at least one piece of distance information. The processing unit is connected to the computing unit. The processing unit is used for receiving and sequentially correcting the phase data of the satellite signal according to the phase observation time correction value. The processing unit receives the satellite signal and when the phase data reaches a predetermined value, performs a first polynomial fitting and a first Chi-square test on the phase data to generate an estimation parameter, then estimates the next batch of phase data of the satellite signal according to the estimation parameter to generate estimated phase data, and then obtains the actual phase data, and detects and compensates a cycle slip according to the estimated phase data and the actual phase data to output a corrected phase observation value.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
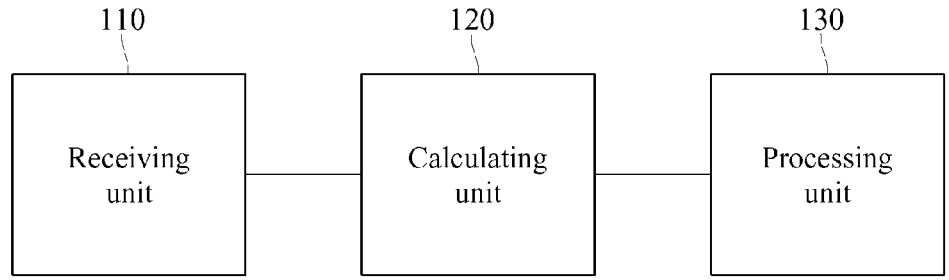
FIG. 1 is a block view of a positioning apparatus according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The characteristics and advantages of the disclosure are described in the following embodiments in details. The content of the disclosure can be easily understood and implemented by a person of average skill in the art. Furthermore, a person skilled in the art would appreciate the related purposes and advantages of the disclosure based on the specification, the appended claims and drawings.

FIG. 1 is a block diagram of a positioning apparatus according to a first embodiment. Referring to FIG. 1, the positioning apparatus 100 of this embodiment may be a GNSS, for example, a low-cost GNSS. The positioning apparatus 100 comprises a receiving unit 110, a computing unit 120 and a processing unit 130.

The receiving unit 110 receives a satellite signal. In other words, the signal receiving unit 110 is connected to a satellite, and thus the positioning apparatus 100 receives a satellite signal sent by the satellite. The computing unit 120 is connected to the receiving unit 110, for generating at least one piece of distance information according to the satellite signal and calculating a phase observation time correction value according to the at least one piece of distance information. Here, the distance information is a virtual distance between the positioning apparatus 100 and the satellite.

The processing unit 130 is connected to the computing unit 120, for sequentially correcting the phase data of the satellite signal according to the phase observation time correction value. The phase data may be, for example, a sampling time that the receiving unit 110 receives the satellite signal. Then, the processing unit 130 sequentially receives a plurality pieces of phase data. When an amount of the phase data reaches a predetermined value, the processing unit 130 performs a first low-order polynomial fitting and a first Chi-square test on the predetermined value pieces of phase data to generate an estimation parameter, and estimates the next piece of phase data of the satellite signal according to the estimation parameter to generate estimated phase data. After that, the processing unit 130 obtains actual phase data relative to the estimated phase data, and detects and compensates a cycle slip according to the estimated phase data and the actual phase data to generate a corrected phase observation value. In this manner, the error of the continuity detection caused by an overlarge clock skew (that is, an overlarge error of the sampling time) of the positioning apparatus 100 may be effectively reduced. Therefore, the positioning apparatus 100 can correct the error of the cycle slip of the phase observation value, which is provided for the relative positioning to use, so as to generate accurate positioning information. For example, the positioning error is approximately at centimeter-level.

In this embodiment, the processing unit 130 may be a microprocessor, a multi-core microprocessor or array, a signal processor or a Field Programmable Gate Array (FPGA).

The operation of the processing unit 130 is generally described as the above, and the detailed operating flow of the processing unit will be further described below.

Firstly, the receiving unit 110 receives a satellite signal. The computing unit 120 obtains distance information according to the satellite signal and obtains the phase observation time correction value according to the distance information and coordinate information. In this embodiment, the positioning apparatus 100 is for example a GNSS at a known place. That is, the coordinate information of the positioning apparatus 100 is already known. The computing unit 120 obtains the phase observation time correction value according to the following equation (1):

$$l = R - c \cdot \Delta t \qquad (1)$$

where l is the distance information, for example, the virtual distance, R is the first coordinate information, for example, the actual distance, c is the light velocity (for example, about $3*10^8$ m/s), and $\Delta t$ is the phase observation time correction value.

In another embodiment, the positioning apparatus 100 for example is a GNSS whose position is unknown. That is, the coordinate position of the positioning apparatus 100 is unknown. Accordingly, the computing unit 120 obtains distance information of a visual satellite in addition to the first distance information, and thus the position and the observation time correction value may be obtained at the same time with a mathematic method (for example, an adjustment method).

After the computing unit 120 calculates the phase observation time correction value $\Delta t$, the computing unit 120 sends the phase observation time correction value $\Delta t$ to the processing unit 130. Then, the processing unit 130 corrects the sampling time that the receiving unit 130 receives the satellite signal according to the phase observation time correction value. In other words, the processing unit 130 sequentially corrects the phase data received by the positioning apparatus 100 according to the calculated phase observation time.

Then, the processing unit 130 sequentially receives a plurality pieces of phase data, and when the amount of the phase data reaches the predetermined value, the processing unit 130 performs the first low-order polynomial fitting on the predetermined value of phase data by the first adjustment method to obtain a first fitting parameter and a first residual. After that, the processing unit 130 performs the first Chi-square test on the first residual to determine whether the initialization of the positioning apparatus 100 is finished. In this embodiment, the predetermined value is for example 10, but it is not limited this way. The predetermined value may be adjusted by the user according to the requirements.

When it is determined that the first residual fails to pass the first Chi-square test, the processing unit 130 deletes the oldest piece of phase data in the predetermined value pieces of phase data (for example, the first piece of the 10 pieces of phase data), and receives the newest piece of phase data (for example, the $11^{th}$ piece of phase data). The first low-order polynomial fitting is performed on the newest piece of phase data by the first adjustment method to obtain the subsequent first fitting parameter and first residual. Then, the first Chi-square test is performed on the subsequent first residual until the subsequent first residual passes the first Chi-square test, so that the first fitting parameter may be regarded as the estimation parameter.

On the other hand, when it is determined that the first residual passes the first Chi-square test, the processing unit 130 regards the first fitting parameter as the estimation parameter. Then, the processing unit 130 estimates the next piece of phase data of the satellite signal according to the estimation parameter to generate estimated phase data. After that, the processing unit 130 obtains the actual phase data corresponding to the estimated phase data, and the processing unit 130 detects and compensates the cycle slip according to the estimated phase data and the actual phase data to generate the corrected phase observation value.

In this embodiment, the processing unit 130 subtracts the estimated phase data from the actual phase data to obtain a difference value, that is, $\Delta\phi(t)=\phi(t)-\bar{\phi}(t)$, where $\phi(t)$ is the actual phase data, $\bar{\phi}(t)$ is the estimated phase data, and $\Delta\phi(t)$ is the difference value. Then, the processing unit works out an absolute value of the difference value $\Delta\phi(t)$ and compares the absolute value with a threshold value, so as to detect if the positioning apparatus 100 generates the cycle slip. The threshold value is, for example, 0.5.

When it is determined that the absolute value of the difference value $\Delta\phi(t)$ is greater than the threshold value, the processing unit 130 takes the difference value $\Delta\phi(t)$ as the cycle slip compensate value, so as to perform the cycle slip compensation on the actual phase data to obtain the compensated phase data. Then, the processing unit 130 regards the compensated phase data as the corrected phase observation value and outputs the corrected phase observation value. Therefore, the positioning information presented by the positioning apparatus 100 is more accurate.

On the other hand, when it is determined that the absolute value of the difference value $\Delta\phi(t)$ is smaller than the threshold value, the cycle slip does not happen to the actual phase data. The processing unit 130 regards the actual phase information as the corrected phase observation value and outputs the corrected phase observation value. Therefore, the positioning information presented by the positioning apparatus 100 is more accurate.

After outputting the corrected phase observation value, the processing unit 130 further deletes the oldest piece of phase data (for example, the 1st piece of phase data) in the predetermined value pieces of phase data, and regards the residual phase data (for example, the 2nd-10th pieces of phase data) and the actual phase data (the 11th piece of phase data) as the updated predetermined value of phase data.

Then, the processing unit 130 performs a second low-order polynomial fitting on the updated predetermined value pieces of phase data (that is, the 2nd-10th pieces of phase data) by a second adjustment method to obtain a second fitting parameter and a second residual.

At this point, the processing unit 130 performs the second Chi-square test on the second residual to determine whether the second residual passes the Chi-square test. If the second residual fails to pass the Chi-square test, the processing unit 130 deletes the oldest piece of phase data (for example, the 2nd piece of phase data in the 2nd-10th pieces of phase data)

in the updated predetermined value pieces of phase data, and receives the new phase data (for example, the 12th piece of phase data) once again. The processing unit 130 performs the second low-order polynomial fitting on the phase data (that is, the 3rd-12th pieces of phase data) until the obtained second residual passes the second Chi-square test.

On the other hand, if the second residual passes the second Chi-square test, the processing unit 130 regards the second fitting parameter as the estimation parameter, for estimating the next updated piece of phase data for the subsequent processing. For example, the second fitting parameter is obtained by fitting the 2nd-10th pieces of phase data, and the estimated next piece of phase data is the 12th piece of phase data. The processing method of regarding the second fitting parameter as the estimation parameter for estimating the next piece of phase data may refer to the above description and thus the details will not be described again herein. In this manner, in this embodiment, the obtaining time of every piece of phase data is sequentially corrected according to the calculated phase observation time correction value, so that the deterioration of the positioning result caused by the clock error of the positioning apparatus 100 can be avoided.

In this embodiment, the first low-order polynomial fitting and the second low-order polynomial fitting may be identical, and the first Chi-square test and the second Chi-square test may also be identical.

Table 1 lists the observation time of the positioning apparatus 100 and the corresponding phase observation data. In this embodiment, the positioning apparatus 100 adopts a group of observation data received by an ublox 4t chipset. The observation site is the Xizhi Dist Taiwan and the observation time is GNSS Time 2010.5.25/00:54:10. The serial number of the satellite is 7. Listed on the left of the symbol "/" in the time (s) is the phase data obtained by the positioning apparatus of this embodiment and it is not corrected by the phase observation time correction value. Listed on the right of the "/" in the time (s) is the phase data obtained by the positioning apparatus of this embodiment and it is corrected by the phase observation time correction value.

TABLE 1

Observation Time of the Positioning Apparatus and Corresponding Phase Observation Value

| Time (s) | Phase observation value (cycle) |
|---|---|
| 3238.99300/3239.00031 | 21650039.9130 |
| 3239.99300/3240.00031 | 21645901.9420 |
| 3240.99300/3241.00031 | 21641764.2460 |
| 3241.99300/3242.00032 | 21637626.8530 |
| 3242.99300/3243.00032 | 21633489.7580 |
| 3243.99300/3244.00032 | 21628352.9590 |
| 3244.99300/3245.00032 | 21625216.4420 |
| 3245.99300/3246.00032 | 21621080.2340 |
| 3246.99300/3247.00033 | 21616944.3120 |
| 3247.99300/3248.00033 | 21612808.6980 |
| 3248.99300/3249.00031 | 21608673.3710 |
| 3250.00300/3251.00034 | 21604538.3460 |

The positioning apparatus 100 performs a second order polynomial fitting by using the preceding 11 pieces of phase observation data to obtain a fitting parameter, and takes the fitting parameter as the estimation parameter. Then, the 12th piece of (current) phase observation data $\bar{\phi}(t)$ (that is, the estimated phase data) is estimated according to the estimation parameter. A difference comparison (that is, subtracting the phase observation data and the actual phase data) is made between the estimated phase observation data and the actual phase observation data $\phi(t)$ (that is, actual phase data) to work out $\Delta\phi(\tilde{t})=0.001$. It may be known from the above that, the calculated phase observation time correction value in this embodiment may be used to correct the errors of the continuous detection originally caused by the clock skew of the positioning apparatus 100 (for example, low-cost positioning apparatus). In addition, according to the data listed in Table 1, the sampling time of the positioning apparatus 100 which is not corrected according to the phase observation time correction value is calculated, and consequently, the phase observation value has the error of 41.350 cycles.

Figure 2:
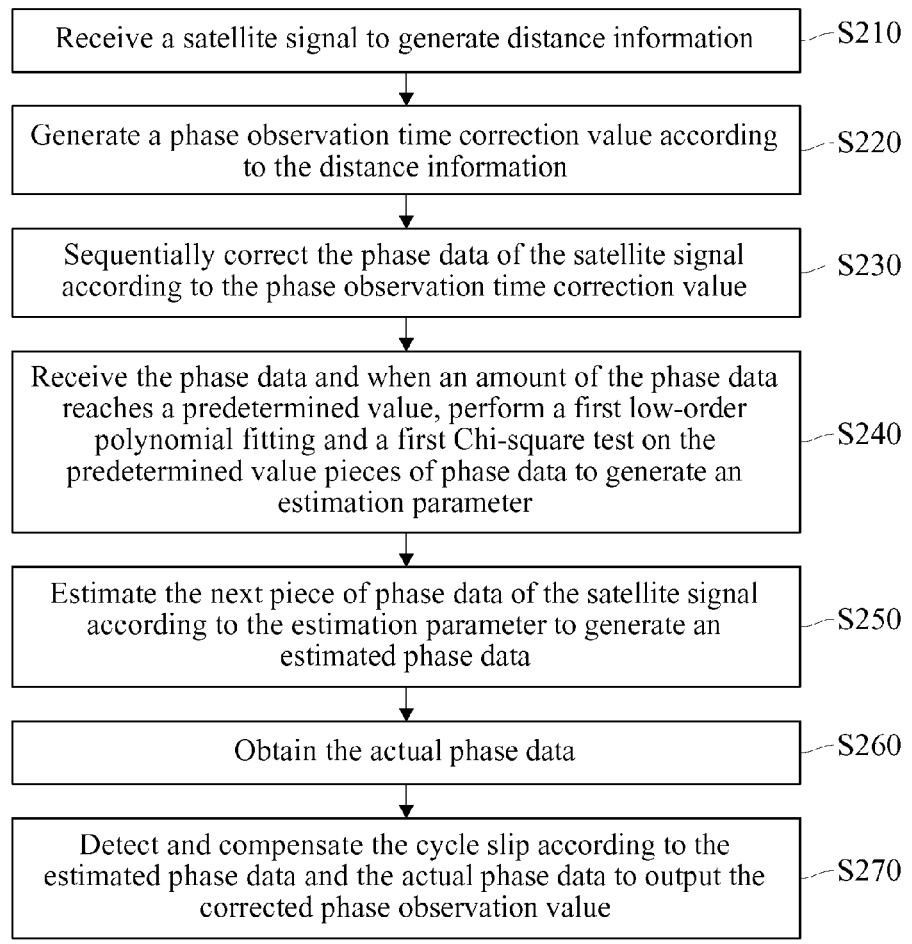
FIG. 2 is a flowchart of a signal processing method for a positioning apparatus according to a second embodiment.

A signal processing method for a positioning apparatus may be concluded from the description of the first embodiment. Referring to FIG. 2, FIG. 2 is a flowchart of a signal processing method for a positioning apparatus according to a second embodiment.

In step S210, the satellite signal is received to generate at least one piece of distance information. In step S220, a phase observation time correction value is generated according to the at least one piece of distance information. In step S230, the phase data of the satellite signal is sequentially corrected according to the phase observation time correction value. In step S240, the phase data is received and when an amount of the phase data reaches a predetermined value, a first low-order polynomial fitting and a first Chi-square test are performed on the predetermined value pieces of phase data to generate an estimation parameter. In step S250, the next piece of phase data of the satellite signal is estimated according to the estimation parameter to generate estimated phase data. In step S260, the actual phase data is obtained. In step S270, the cycle slip is detected and compensated according to the estimated phase data and the actual phase data to output the corrected phase observation. In addition, in this embodiment, steps S240-S270 may be realized by a discontinuous detection method (for example, by using Kalman Filter).

Figure 3:
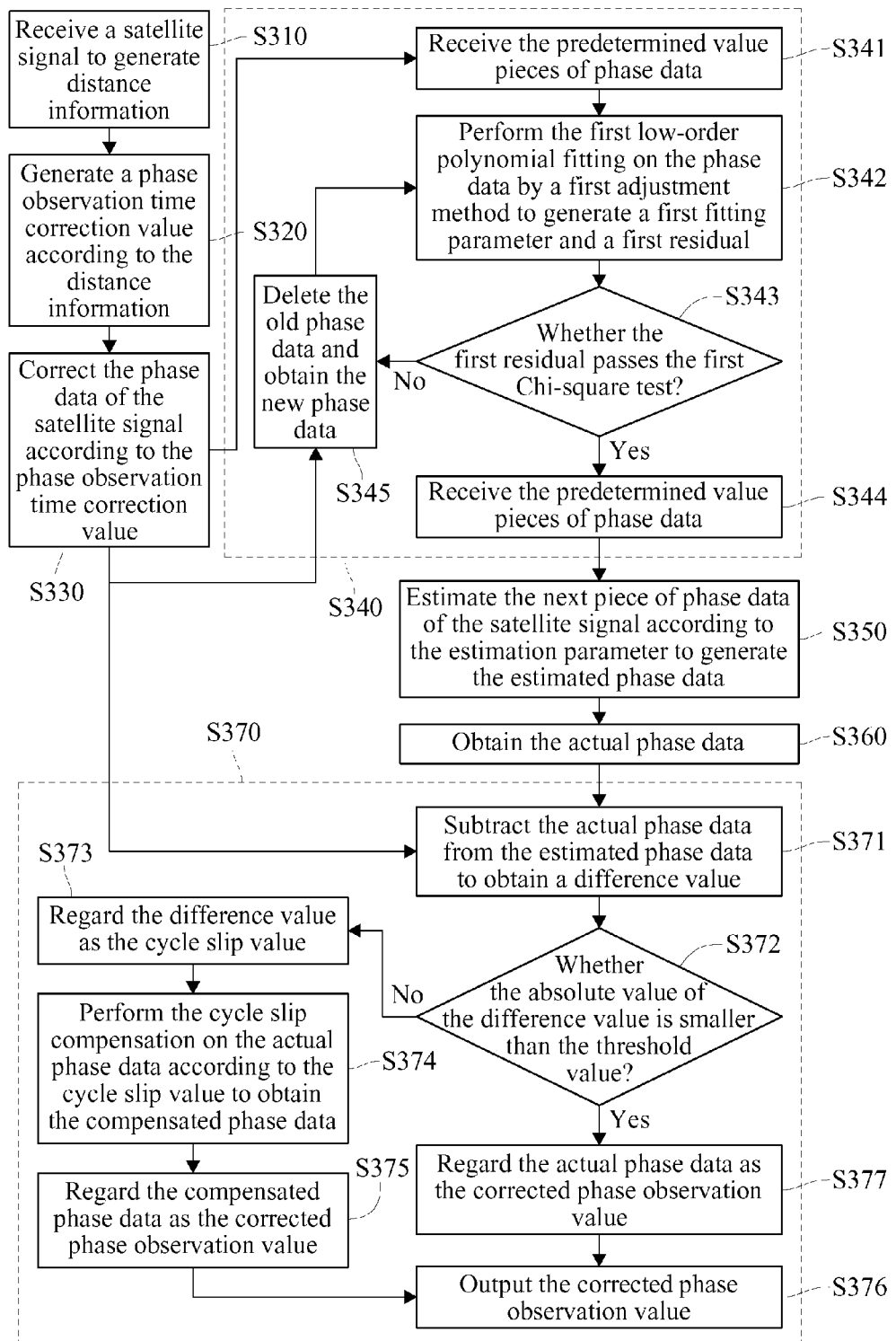
FIG. 3 is a detailed flowchart of the signal processing method for the positioning apparatus in FIG. 2.

Referring to FIG. 3, FIG. 3 is a detailed flowchart of the signal processing method for the positioning apparatus in FIG. 2. Steps S310, S320, S330, S350 and S360 of this embodiment may refer to the description of the steps S210, S220, S230, S250 and S260 in the second embodiment, and thus these steps will not be described again herein.

The step S340 comprises the following steps. In step S341, the predetermined value pieces of phase data is received. In step S342, a first low-order polynomial fitting is performed on the predetermined value pieces of phase data by a first adjustment method to generate a first fitting parameter and a first residual. In step S343, a first Chi-square test is performed on the first residual to determine whether the first residual passes the first Chi-square test. If the first residual passes the first Chi-square test, the method goes to step S344 where the first fitting parameter is regarded as the estimation parameter.

On the other hand, if the first residual fails to pass the first Chi-square test, the method goes to step S345 where the oldest piece of phase data in the predetermined value pieces of phase data is deleted and the newest piece of phase data is obtained. Then, the method returns to step S342 where a first low-order polynomial fitting is performed on the new predetermined value pieces of phase data to obtain the new first fitting parameter and the first residual until the subsequent first residual passes the first Chi-square test.

In addition, the step S370 comprises the following steps. In step S371, the actual phase data is subtracted from the estimated phase data to obtain a difference value. In step S372, it is determined whether the absolute value of the difference value is smaller than the threshold value. If the absolute value of the difference value is determined to be greater than the threshold value, the method goes to step S373 in which the difference value is regarded as the cycle slip value. In this embodiment, the step of regarding the difference value as the cycle slip value further comprises rounding the difference value to be an integer. That is, the value of the cycle slip is the integer.

In step S374, the cycle slip compensation is performed on the actual phase data according to the cycle slip value to obtain the compensated phase data. In step S375, the compensated phase data is regarded as the corrected phase observation value. Then, in step S376, the corrected phase observation value is output. In addition, after step S372, if the absolute value of the difference value is determined to be smaller than the threshold value, it means that the actual phase data has no cycle slip. Then, the method goes to step S377 where the actual phase data is regarded as the corrected phase observation value. In step S376, the corrected phase observation value is output.

Figure 4:
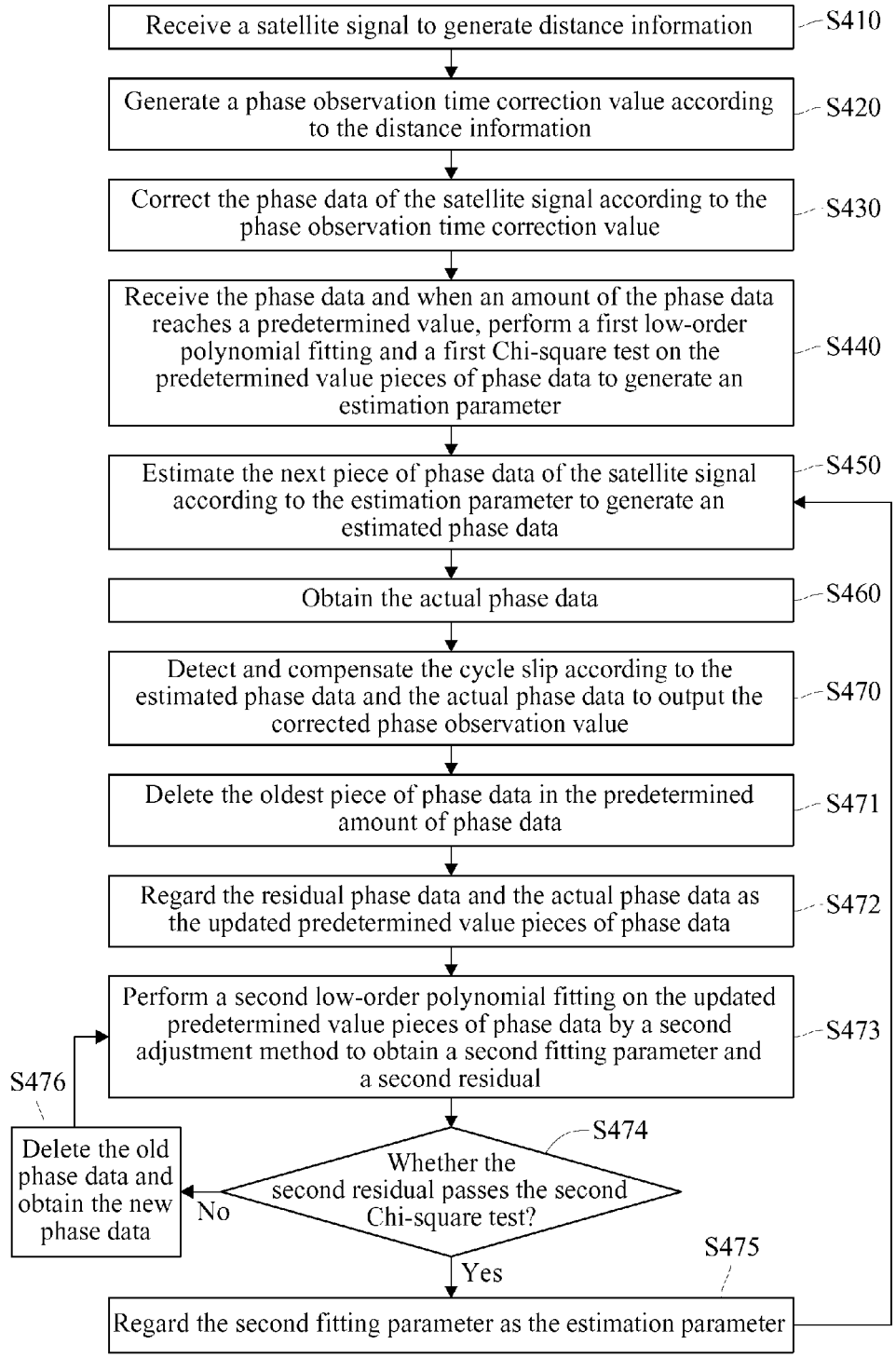
FIG. 4 is a flowchart of a signal processing method for a positioning apparatus according to a third embodiment.

Referring to FIG. 4, FIG. 4 is a flowchart of a signal processing method for a positioning apparatus according to a third embodiment. Steps S410, S420, S430, S440, S450, S460 and S470 of this embodiment may refer to the description of the step S210, S220, S230, S240, S250, S260 and S270 in the second embodiment, and thus they will not be described again herein.

After step S470, when the corrected phase observation value is output, the method goes to step S471 where the oldest piece of phase data in the predetermined value pieces of phase data is deleted. In step S472, the residual phase data and the actual phase data are regarded as the updated predetermined value pieces of phase data. In step S473, a second low-order polynomial fitting is performed on the updated predetermined value pieces of phase data by a second adjustment method to obtain a second fitting parameter and a second residual. In step S474, the second Chi-square test is performed on the second fitting parameter to determine whether the second residual passes the second Chi-square test.

If the second residual fails to pass the second Chi-square test, the method goes to step S475 where the oldest piece of phase data in the updated predetermined value pieces of phase data is deleted and the newest piece of phase data is obtained. Then, the method returns to step S473, where the second low-order polynomial fitting is performed on the phase data again to generate a new second fitting parameter and second residual until the second residual is determined to pass the second Chi-square test in step S474. After that, the method goes to step S476.

On the other hand, after step S474, if the second residual passes the second Chi-square test, the method goes to step S476 where the second fitting parameter is regarded as the estimation parameter. Then, the method returns to step S450, where the next piece of phase data is estimated according to the second fitting parameter, so as to perform the subsequent detection and compensation of the cycle slip of the phase data. In this embodiment, the first low-order polynomial fitting and the second low-order polynomial fitting may be identical, and the first Chi-square test and the second Chi-square test may be identical.

In view of the above, in the positioning apparatus and the signal processing method thereof disclosed in the present disclosure, the phase data of the satellite signal may be sequentially corrected (the sampling time of the positioning apparatus is corrected) according to the calculated phase observation time correction value. Then, the detection and compensation of the cycle slip of the phase observation (that is, the continuity detection of the phase data) may be performed according to the corrected phase data, so as to output the precise corrected phase observation value. In this manner, the clock error of the positioning apparatus may be effectively reduced, and the cycle slip error may be corrected according to the phase observation value, so that the positioning information of the positioning apparatus is more accurate.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A signal processing method for a positioning apparatus, comprising:
    receiving a satellite signal to generate at least one piece of distance information;
    generating a phase observation time correction value according to the at least one piece of distance information;
    sequentially correcting a plurality pieces of phase data of the satellite signal according to the phase observation time correction value;
    receiving the phase data and when an amount of the phase data reaches a predetermined value, performing a first low-order polynomial fitting and a first Chi-square test on the predetermined value pieces of phase data to generate an estimation parameter;
    estimating the next piece of phase data of the satellite signal according to the estimation parameter to generate estimated phase data;
    obtaining actual phase data; and
    detecting and compensating a cycle slip according to the estimated phase data and the actual phase data to output a corrected phase observation value.

2. The signal processing method for the positioning apparatus according to claim 1, wherein the step of when the phase data reaches the predetermined value, performing the first low-order polynomial fitting and the first Chi-square test on the phase data to generate the estimation parameter comprises:
    receiving the predetermined value pieces of phase data;
    performing the first low-order polynomial fitting on the phase data by a first adjustment method to generate a first fitting parameter and a first residual;
    performing the first Chi-square test on the first residual;
    if the first residual passes the first Chi-square test, regarding the first fitting parameter as the estimation parameter; and
    if the first residual fails to pass the first Chi-square test, deleting the oldest piece of phase data in the predetermined value pieces of phase data and obtaining the newest piece of phase data to perform the first low-order polynomial fitting again until the subsequent first residual passes the first Chi-square test.

3. The signal processing method for the positioning apparatus according to claim 1, wherein the step of detecting and compensating the cycle slip according to the estimated phase data and the actual phase data to output the corrected phase observation value comprises:
    subtracting the actual phase data from the estimated phase data to obtain a difference value;
    determining whether an absolute value of the difference value is smaller than a threshold value;
    if the absolute value of the difference value is greater than the threshold value, regarding the difference value as a cycle slip value; and performing a cycle slip compensation on the actual phase data according to the cycle slip value to obtain compensated phase data;

regarding the compensated phase data as the corrected phase observation value; and outputting the corrected phase observation value.

4. The signal processing method for the positioning apparatus according to claim 3, wherein the step of determining whether the absolute value of the difference value is smaller than the threshold value further comprises:

if the absolute value of the difference value is smaller than the threshold value, regarding the actual phase data as the corrected phase observation value.

5. The signal processing method for the positioning apparatus according to claim according to claim 3, wherein the step of regarding the difference value as the cycle slip value further comprises rounding the difference value to be an integer value.

6. The signal processing method for the positioning apparatus according to claim 1, after the step of outputting the corrected phase observation value, the method further comprising:

deleting the oldest piece of phase data in the predetermined value pieces of phase data;

regarding the residual phase data and the actual phase data as the updated predetermined value pieces of phase data;

performing a second low-order polynomial fitting on the updated predetermined value pieces of phase data by a second adjustment method to generate a second fitting parameter and a second residual;

performing a second Chi-square test on the second residual;

if the second residual passes the second Chi-square test, regarding the second fitting parameter as the estimation parameter; and if the second residual fails to pass the second Chi-square test, deleting the oldest piece of phase data in the updated predetermined value pieces of phase data and obtaining the newest batch of phase data to perform the second low-order polynomial fitting again until the subsequent second residual passes the second Chi-square test.

7. The positioning method according to claim 1, wherein a discontinuous detection method is adopted to accomplish the step of receiving the phase data and when the amount of phase data reaches the predetermined value, performing the first low-order polynomial fitting and the first Chi-square test on the predetermined value pieces of phase data to generate the estimation parameter, the step of estimating the next piece of phase data of the satellite signal according to the estimation parameter to generate the estimated phase data, the step of obtaining the actual phase data and the step of detecting and compensating the cycle slip according to the estimated phase data and the actual phase data to output the corrected phase observation value.

8. A positioning apparatus, comprising:

a receiving unit, for receiving a satellite signal;

a computing unit, connected to the receiving unit, for generating at least one piece of distance information according to the satellite signal and calculating a phase observation time correction value according to the at least one piece of distance information;

a processing unit, connected to the computing unit, for receiving and sequentially correcting a plurality pieces of phase data of the satellite signal according to the phase observation time correction value, receiving the phase data and when an amount of the phase data reaches a predetermined value, performing a first polynomial fitting and a first Chi-square test on the predetermined value pieces of phase data to generate an estimation parameter, then estimating the next piece of phase data of the satellite signal according to the estimation parameter to generate estimated phase data, and then obtaining actual phase data and detecting and compensating a cycle slip according to the estimated phase data and the actual phase data to output a corrected phase observation value.

9. The positioning apparatus according to claim 8, wherein the processing unit receives the predetermined value pieces of phase data, performs the first low-order polynomial fitting on the phase data by a first adjustment method to generate a first fitting parameter and the first residual, and performs the first Chi-square test on the first fitting parameter, wherein if the first residual passes the first Chi-square test, the processing unit takes the first fitting parameter as the estimation parameter, and if the first residual fails to pass the first Chi-square test, the processing unit deletes the oldest piece of phase data in the predetermined value pieces of phase data and obtains the newest piece of phase data to perform the first low-order polynomial fitting again until the subsequent first residual passes the first Chi-square test.

10. The positioning apparatus according to claim 8, wherein the processing unit subtracts the actual phase data from the estimated phase data to obtain a difference value, and determines whether an absolute value of the difference value is smaller than a threshold value, wherein if the absolute value of the difference value is greater than the threshold value, the difference value is regarded as a cycle slip value, and the processing unit performs a cycle slip compensation on the actual phase data according to the cycle slip value to obtain compensated phase data and regards the compensated phase data as the corrected phase observation value and outputs the corrected phase observation value.

11. The positioning apparatus according to claim 10, wherein if the absolute value of the difference value is smaller than the threshold value, the processing unit regards the actual phase data as the corrected phase observation value and outputs the corrected phase observation value.

12. The positioning apparatus according to claim 10, wherein the processing unit further rounds the difference value to be an integer value.

13. The positioning apparatus according to claim 8, wherein the processing unit deletes the oldest piece of phase data in the predetermined value pieces of phase data and takes the residual phase data and the actual phase data as the updated predetermined value pieces of phase data, and the processing unit performs a second low-order polynomial fitting on the updated predetermined value pieces of phase data by a second adjustment method to generate a second fitting parameter and a second residual and performs a second Chi-square test on the second residual, wherein if the second residual passes the second Chi-square test, the processing unit regards the second fitting parameter as the estimation parameter, and if the second residual fails to pass the second Chi-square test, the processing unit deletes the oldest piece of phase data in the updated predetermined value pieces of phase data and obtains the newest piece of phase data to perform the second low-order polynomial fitting again until the subsequent second residual passes the second Chi-square test.

14. The positioning apparatus according to claim 8, wherein the processing unit adopts a discontinuous detection method to accomplish receiving the phase data and when the amount of phase data reaches the predetermined value, performing the first polynomial fitting and the first Chi-square test on the predetermined value pieces of phase data to generate the estimation parameter, and estimating the next piece of phase data of the satellite signal according to the estimation parameter to generate the estimated phase data, then obtaining the actual phase data and detecting and compensating the cycle slip according to the estimated phase data and the actual phase data to output the corrected phase observation value.

\* \* \* \* \*